US009338034B2

(12) United States Patent
Ekbatani et al.

(10) Patent No.: US 9,338,034 B2
(45) Date of Patent: May 10, 2016

(54) TERNARY SEQUENCES WITH POWER OF TWO EXPONENT DIMENSIONALITIES SUITABLE FOR CHANNEL ESTIMATION

(71) Applicant: QUALCOMM Incorporated, San Diego, CA (US)

(72) Inventors: Siavash Ekbatani, San Diego, CA (US); Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 14/049,256

(22) Filed: Oct. 9, 2013

(65) Prior Publication Data

US 2015/0098345 A1      Apr. 9, 2015

(51) Int. Cl.
| | |
|---|---|
| H04L 25/02 | (2006.01) |
| H04L 25/49 | (2006.01) |
| G01S 5/06 | (2006.01) |
| G01S 5/00 | (2006.01) |
| G01S 5/02 | (2010.01) |
| G01S 11/08 | (2006.01) |
| G06Q 10/00 | (2012.01) |
| H04W 64/00 | (2009.01) |
| G08B 21/02 | (2006.01) |

(52) U.S. Cl.
CPC ............... *H04L 25/024* (2013.01); *G01S 5/00* (2013.01); *G01S 5/0205* (2013.01); *G01S 5/0215* (2013.01); *G01S 5/0221* (2013.01); *G01S 5/0226* (2013.01); *G01S 11/08* (2013.01); *G06Q 10/00* (2013.01); *H04L 25/0226* (2013.01); *H04L 25/4923* (2013.01); *H04W 64/00* (2013.01); *G01S 5/06* (2013.01); *G08B 21/0272* (2013.01)

(58) Field of Classification Search
None
See application file for complete search history.

(56) References Cited

U.S. PATENT DOCUMENTS

| | | | |
|---|---|---|---|
| 6,937,573 | B2 | 8/2005 | Chan et al. |
| 8,295,389 | B2 | 10/2012 | Han et al. |
| 8,320,360 | B2 | 11/2012 | Fukuta et al. |
| 8,503,547 | B2 | 8/2013 | Luo et al. |
| 2005/0286465 | A1 | 12/2005 | Zhuang |

(Continued)

FOREIGN PATENT DOCUMENTS

WO    WO-2009028876 A2    3/2009

OTHER PUBLICATIONS

Kim et al., "MSE Performance Evaluation of Zero-Padded CAZAC Sequence for Reasonable Utilization," IEICE Transactions on Communications, vol. E90-B, No. 12, Dec. 2007, pp. 3712-3715, the IEICE Publishing Office, Tokyo, Japan.
Liu et al., "New Constructions of Zero-Correlation Zone Sequences," IEEE Transactions on Information Theory, vol. 59, No. 8, Aug. 2013, pp. 4994-5007, Institute of Electrical and Electronics Engineers.
Olonbayar et al., "Synchronisation Performance of Wireless Sensor Networks," 2008 IEEE International Conference on Ultra-Wideband, ICUWB 2008, vol. 2, Hannover, Sep. 10-12, 2008, pp. 59-62, ISBN 978-1-4244-2216-6, Institute of Electrical and Electronics Engineers.

(Continued)

*Primary Examiner* — Michael Thier
*Assistant Examiner* — Yaotang Wang
(74) *Attorney, Agent, or Firm* — Holland & Hart LLP

(57) ABSTRACT

Methods, systems, and devices for channel estimation in a location tracking system are described. The methods, system, and devices may include tools and techniques for determining and/or designing perfect or semi-perfect sequences (including preamble sequences) for implementation in a location tracking system. Sequences having 2's exponent dimensionality, such as ternary sequences, may be determined and employed, which may help reduce implementation complexity and/or operating power consumption. Sequences may be determined using mean square error and/or maximum autocorrelation peak performance metrics.

30 Claims, 11 Drawing Sheets

(56) References Cited

U.S. PATENT DOCUMENTS

| | | | |
|---|---|---|---|
| 2006/0050799 A1 | 3/2006 | Hou et al. | |
| 2008/0259896 A1 | 10/2008 | Sahinoglu et al. | |
| 2011/0013716 A1* | 1/2011 | Brodzik | G01S 13/003 375/295 |
| 2013/0003675 A1 | 1/2013 | Han et al. | |
| 2013/0201913 A1* | 8/2013 | Niemela | 370/328 |
| 2014/0266914 A1* | 9/2014 | Schwartz et al. | 342/463 |

OTHER PUBLICATIONS

ISA/EPO, International Search Report and Written Opinion of the International Searching Authority, Int'l App. No. PCT/US2014/058002, Dec. 5, 2014, European Patent Office, Rijswijk, NL, 19 pgs.

IPEA/EPO, Second Written Opinion of the International Preliminary Examining Authority, Int'l App. No. PCT/US2014/058002, Sep. 11, 2015, European Patent Office, Munich, DE, 10 pgs.

* cited by examiner

TERNARY SEQUENCES WITH POWER OF TWO EXPONENT DIMENSIONALITIES SUITABLE FOR CHANNEL ESTIMATION

BACKGROUND

In certain indoor and enterprise environments it may be important to easily locate various types of assets or people, or both. Hospitals, retail stores, and warehouses may all be examples of such settings. The accuracy and speed with which the location of assets or people is monitored in an indoor setting may be an important factor in determining the usefulness of the tracking system. In addition, having a tracking system that is cost effective, scalable, and that can provide continuous, accurate, and precise location monitoring is also desirable.

Different systems and devices may be used to locate assets and/or people in a particular indoor environment. An ultra-wideband (UWB) network, or some other radio frequency network deployed throughout at least a portion of the indoor environment, may be configured to perform indoor tracking. Systems may employ multiple access points (APs) placed at specific locations in the indoor environment. A location tracking tag also may be attached to each mobile asset and/or to each person to be tracked. The tag may send waveforms (e.g., beacon signals) that are received by the APs for ranging measurements to determine the distance between the tag and the APs that receive the waveforms. Once the distances between the tag and at least three different APs are obtained, triangulation or trilateration may be used to estimate the location of the asset or person to which the tag is attached.

Determining distances between APs and tags may include determining a round trip delay between a tag and different APs. But, in many cases, channel estimation may occur prior to determining the round trip time delay.

SUMMARY

The described features generally relate to one or more improved methods, systems, and/or devices for channel estimation. These may include determining and utilizing sequences suitable for channel estimation. In some cases, perfect or semi-perfect sequences are employed, including sequences with 2s exponent dimensionality—e.g., ternary sequences.

A method to perform channel estimation is described. An initial real sequence including perfect circular autocorrelation may be selected. An initial modification to a length of the initial real sequence may be performed. A frequency response of the initial real sequence may be converted to a time domain.

In one embodiment, the time domain of the initial real sequence may be quantized to a predetermined number of levels with an optimal threshold, and a performance metric based at least in part on the initial modified length and the quantitized time domain of the initial real sequence may be iteratively calculated. Quantitizing may include applying a three level quantitization.

In one example, a determination may be made as to whether to perform an additional modification to the length of the initial real sequence based at least in part on each of the iterative calculations of the performance metric. The length of the initial real sequence may be $2^d-1$. In one example, the performance metric may include a mean square error function. In one example, the performance metric may include a maximum autocorrelation peak metric. A determination may be made to perform the additional modification when a minimum mean square error is reached. Performing the initial modification may include adding an element within the initial real sequence.

A system for performing channel estimation is also described. The system may include means for selecting an initial real sequence comprising perfect circular autocorrelation, means for performing an initial modification to a length of the initial real sequence, and means converting a frequency response of the initial real sequence to a time domain.

An apparatus for performing channel estimation is also described. The apparatus may include a processor and memory in electronic communication with the processor. Instructions may be stored in the memory. The instructions may be executable by the processor to select an initial real sequence comprising perfect circular autocorrelation, perform an initial modification to a length of the initial real sequence, and convert a frequency response of the initial real sequence to a time domain.

A computer-program product for channel estimation is also described. The computer-program product may include a non-transitory computer-readable medium storing instructions executable by a processor to select an initial real sequence comprising perfect circular auto correlation, perform an initial modification to a length of the initial real sequence, and convert a frequency response of the initial real sequence to a time domain.

Further scope of the applicability of the described methods, systems, and devices will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described related to channel estimation in location tracking systems. These may include determining or designing, or both, a sequence for use with determining a location of a location tracking tag. To achieve low implementation complexity, it may be desirable to employ a preamble sequence having a minimum period dimensionality that is a power of 2. In some cases, utilizing such a 2's exponent dimensionality sequence, e.g., $N=2^d$, will allow for implementation of a channel estimation scheme based on a radix-2 fast Fourier transform (FFT) engine, which, in turn, may reduce circuit complexity.

Designing a sequence with 2's exponent dimensionality, e.g., a ternary sequence, may include solving certain optimization problems. In some instances, sequence determination requires modifying the length of a sequence or modifying a spectral response of a sequence, or both.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms DTX and discontinuous transmission interchangeably.

Figure 1A:
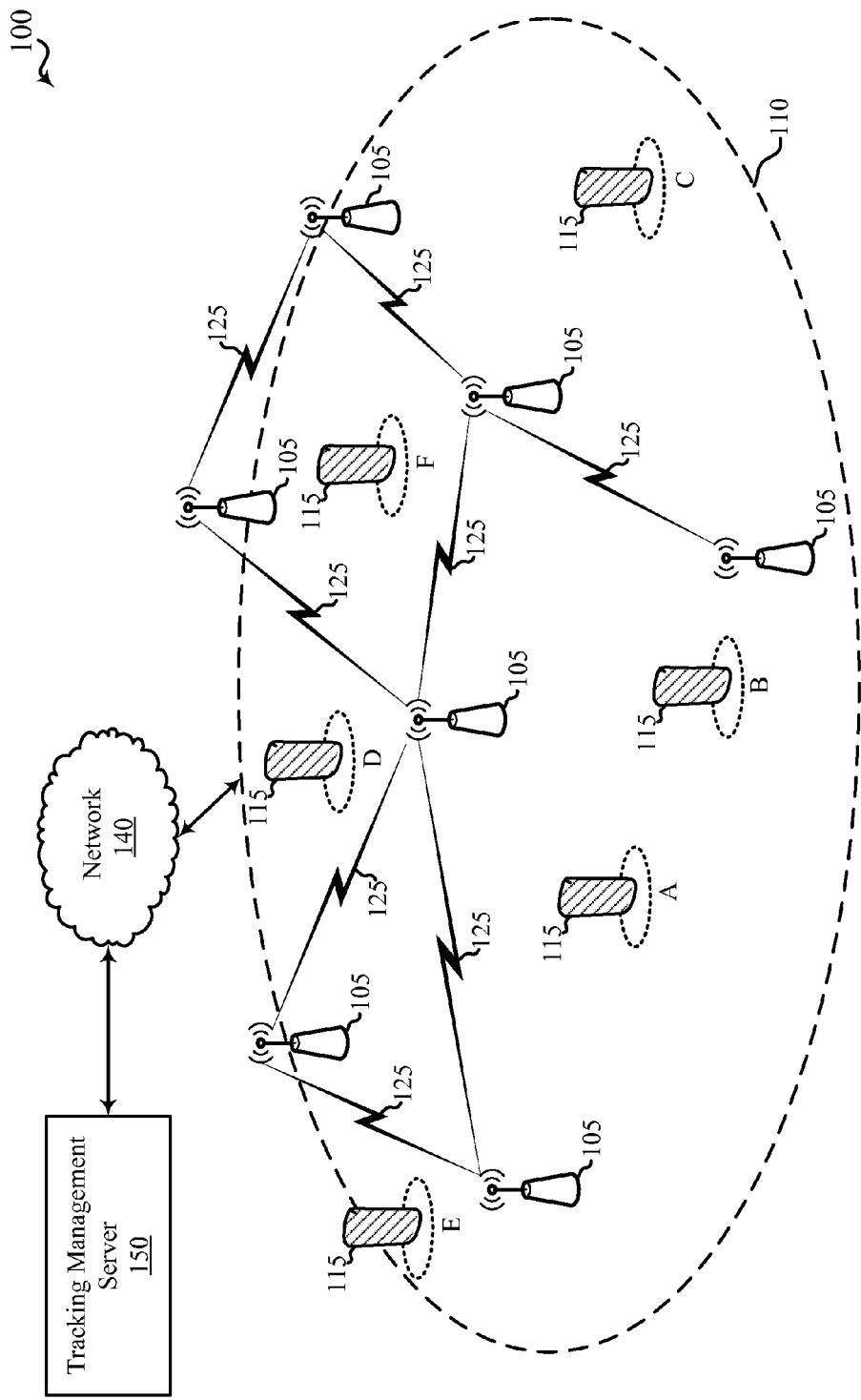
FIGS. 1A and 1B show an example(s) of a location tracking system in accordance with various embodiments.

First, FIG. 1A depicts an example of a location tracking system 100 in accordance with various embodiments. The system 100 provides location tracking of assets (e.g., objects) or people, or both, throughout the coverage area 110 associated with an indoor and/or enterprise environment. In some embodiments, the coverage area 110 represents an area of coverage inside a building, such as a hospital, a retail store, or a warehouse. Within the coverage area 110, multiple APs 105 may be deployed at specific locations, as may multiple tags 115 (also referred to as tag units and location tracking tags), which may be tracked within the coverage area 110. Because of their stationary nature, the exact distance between any two APs 105 is typically known, or may be determined, throughout the operation of the system 100. Any two APs 105 may ascertain the distance between themselves through a ranging operation, which may be a two-way ranging operation. The ranging operation may be performed via communication links 125.

The arrangement of APs 105 shown in FIG. 1A is intended as a non-limiting example. The APs 105 may be deployed or distributed within the coverage area 110 in a manner or pattern different from that depicted in FIG. 1A. For example, the APs 105 may be arranged at different distances from one another. In some cases, the coverage area 110 represents a two-dimensional deployment, such as a single floor within a building. But in some embodiments, the APs 105 are deployed in a three-dimensional manner by placing some of the APs 105 on different floors or levels of a building within the coverage area 110.

Each of the tag units 115 may be attached to an asset of person being tracked within the coverage area 110. The tag units 115 may be equipped with a narrowband transceiver or a UWB transmitter, or both. The tag units 115 may also have one or more oscillators or timers, or both. The oscillators may each produce a repetitive, oscillating electronic signal, which may be adjustable and/or variable. These signals may be based on, and or include sequences having 2s exponent dimensionality.

FIG. 1A depicts an example location tracking system 100 with six tag units 115 at locations A, B, C, D, E, and F. Over time, these locations may change as the assets or people to which the tags 115 are attached move or are moved within the coverage area 110. The system 100, shown with six tags 115, is intended as a non-limiting example of a location tracking system. Those skilled in the art will recognize that the system 100 is scalable, and it may be capable of tracking more or fewer assets or people.

The system 100 includes a tracking management server 150, which also may be referred to as a tag tracking management server or a location tracking server. In some embodiments, the tracking management server 150 is connected to the APs 105 through a network 140. The connection may be by way of a radio network associated with the APs 105. The tracking management server 150 may perform various functions related to channel estimation, including: determining a sequence(s) that provide for low implementation complexity for channel estimation. The tracking management server 150 may also estimate a location of an asset or person being tracked within the coverage area 110.

The APs 105 may communicate with one another by sending and/or receiving UWB signals. The channels between APs 105, which are associated with communication links 125, are often characterized by noise and signal-degrading impedances. In some cases, the inter-AP 105 communication includes a channel estimation step. The APs 105 may employ a perfect or semi-perfect sequence in this communication, which may allow for receiver and/or transmitter circuits of lesser complexity.

Figure 1B:
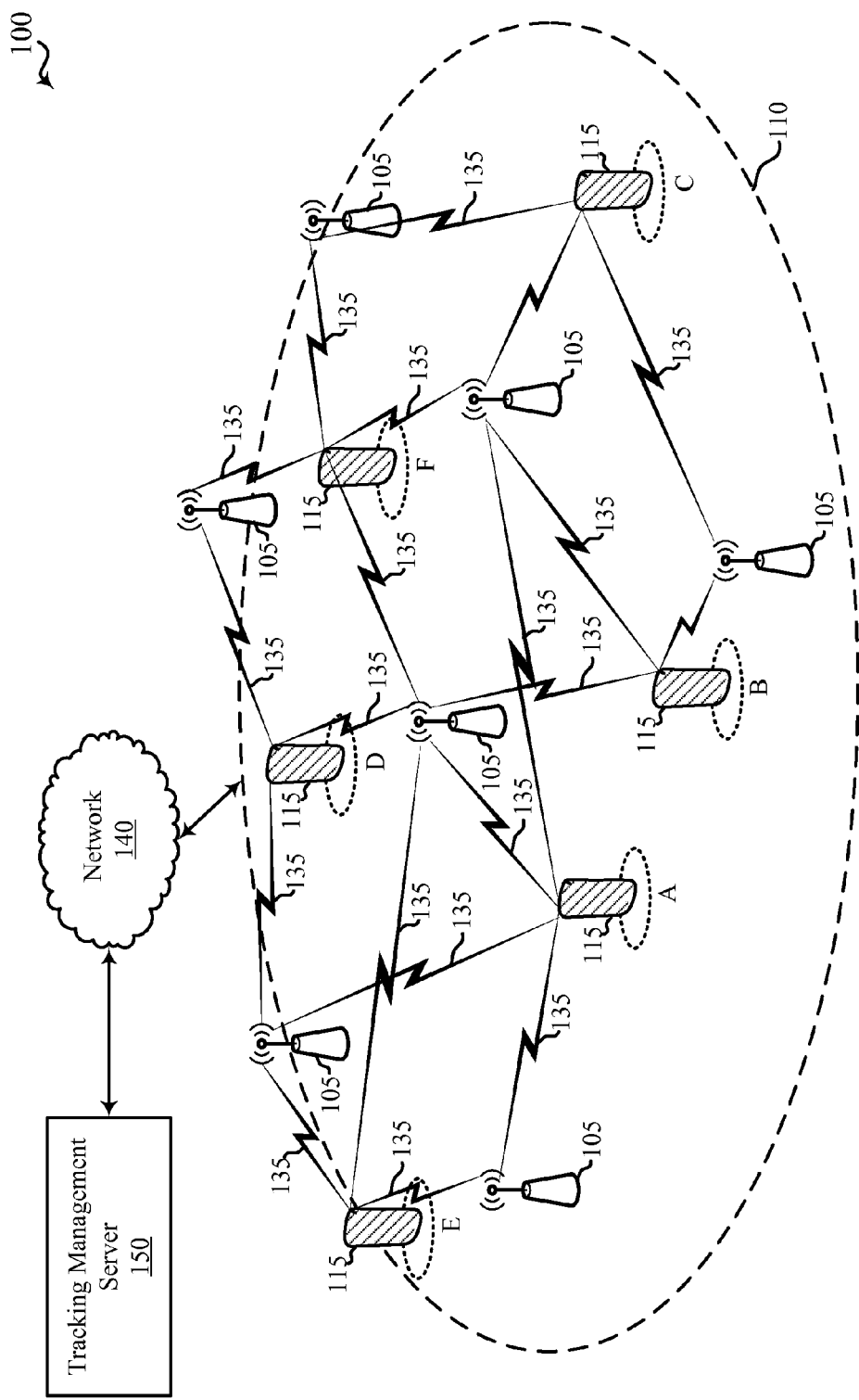

Next, FIG. 1B illustrates transmissions or broadcasts between APs 105 and tags 115 via communication links 135. In some embodiments, the tags 115 communicate with APs 105 via the communication links 135 using either or both UWB and narrowband signals. Whether a tag 115 communicates primarily with narrowband or UWB may be a function of whether the tag 115 is mobile or stationary.

The tags 115 may communicate with APs 105 by sending and/or receiving UWB signals. For example, a tag 115 may broadcast a signal that is received by a number of APs 1-5. For each AP 105 that receives a signal, the tracking management server 150 may determine the round-trip delay associated with the signal broadcast and each receiving AP 105. In some cases, the initial step in determining a location of a tag 115—e.g., a necessary predicated to determining round-trip delay—is channel estimation.

By way of example, channel estimation involves estimating a vector h from observation of a signal:

$$y_R[n]=x[n]*h+w_R[n] \qquad (1)$$

where x[n] is a transmit sequence vector across a duration of one period, N, and $w_R[n]$ is a Gaussian noise vector having a variance $\sigma_R^2$.

In some instances, such as in an absence of user interference, an unbiased estimator of a channel vector may be formulated by:

$$\hat{h}=F^H\Theta^{-1}Fy_R \qquad (2)$$

where F is an N×N normalized FFT matrix $$[F]_{k_1,k_2} = \frac{1}{\sqrt{N}} \exp\left(-j\frac{2\pi k_1 k_2}{N}\right) \quad (3)$$

and $\Theta$ is a diagonal matrix with diagonal elements equal to a Fourier transform of the sequence x[n] over one period $$\Theta = \text{Diag}\left\{\frac{1}{\sqrt{N}}\mathcal{F}(x[n])\right\}. \quad (4)$$

The diagonal elements of the matrix $\Theta$ may be defined as $\Theta_i$ for i=0, 1, ..., N−1. Additionally, the operator may refer to a direct Fourier transform (DFT) operation on a vector—e.g., an function similar to fft(∩) in MATLAB.

According to Parseval's theorem, it may be shown that $$Tr\{|\Theta|^2\} = \sum_{n=0}^{N-1} |x[n]|^2 \quad (5)$$

utilizing a trace operator, $Tr\{*\}$. Further, a signal to noise ratio (SNR) of the observation signal may be defined as:

$$SNR = \frac{Tr\{|\Theta|^2\}}{N\sigma_R^2}. \quad (6)$$

Referring to Equation 1, basic channel estimation may involve determining a linear filter to reverse an operation of x[n] convolution from observation of $y_R$ [n]. So, in some cases, channel estimation involves applying a filter $\hat{\theta}[n]$ to $y_R$ [n] with a frequency response equal to the diagonal matrix $\Theta^{-1}$, which is the inverse of the diagonal matrix $\Theta$. For example:

$$\hat{\theta}[n]*y_R[n] = \hat{h} + \hat{\theta}[n]*w_R[n]. \quad (7)$$

The expression $F^H \Theta^{-1} F y_R$ of Equation 2 may model the relevant filtering operation (e.g., de-convolution). A mean square error (MSE) of the channel estimation in Equation 7 may be expressed as:

$$MSE = \sigma_R^2 \frac{\sum_{n=0}^{N-1} |\hat{\theta}[n]|^2}{N}$$
$$= \frac{Tr\{|\Theta|^{-2}\}Tr\{|\Theta|^2\}}{N^2 SNR} \quad (8)$$

where $|\Theta|^{-2}$ s a diagonal matrix with diagonals equal to $$\frac{1}{|\theta_i|^2}$$

for i=0, 1, ..., N−1.

Accordingly, an MSE metric may be defined as follows:

$$MSE_L = 10 \times \log(Tr\{|\Theta|^{-2}\}Tr\{|\Theta|^2\}). \quad (9)$$

In some cases, an optimal value (e.g., a minimum) of $MSE_L$ is 0 dB, such as for preamble sequences with flat-amplitude frequency response. In some embodiments, e.g., for preambles constructed upon an m-sequence, the $MSE_L$ value is $$\log\left(\frac{2N}{N+1}\right),$$

which approaches 3 dB as the sequence length grows.

A preamble sequence that achieves a minimum possible MSE with unbiased estimation may be desired solutions to the following optimization problem:

$$\{\theta_i\}_{i=0,1,\ldots,N-1} = \text{argmin}_{\mathcal{R}^N}\left(\sum_{i=0}^{N-1} |\theta_i|^2\right)\left(\sum_{i=0}^{N-1} \frac{1}{|\theta_i|^2}\right) \quad (10)$$

s.t.

$$\sum_{i=0}^{N-1} |\theta_i|^2 = C$$

where $\theta_i$ are the diagonal elements of the matrix $\Theta$, C is a constant proportional to the SNR, and $\mathcal{R}^N$ is an N-dimensional real number space. Using a Lagrange method, a solution space for the Optimization Problem 10 may be restricted, such that a solution that satisfies the Optimization Problem 10 has the following form:

$$|\theta_0|^2 = |\theta_1|^2 = \ldots = |\theta_{N-1}|^2 \quad (11)$$

A preamble sequence corresponding to the minimum MSE with a linear unbiased estimator has a flat amplitude frequency response. In some cases, sequences that exhibit the property set forth in Equation 11 are called perfect sequences. Such sequences may not exist with arbitrary dimensionality. In order to achieve low implementation complexity for channel estimation, it may be advantageous to determine a preamble sequence with a minimum period dimensionality that is a power of 2, e.g., $N=2^d$.

Those skilled in the art will note that, in general, short-length sequences may not be relied upon to achieve the same beneficial results described herein. In some cases, a pulse train should encompass the entire length of an indoor channel. A short sequence may not be suitable for this. Thus, in order to utilize short sequences, it may be necessary to up-sample (e.g., insert one or more zeros) among elements of the sequence. This up-sampling may result in a resolution that incurs high peak-to-average power ration (PAPR) at transmitter circuitry, which, in turn, may lead to higher-than-desirable implementation complexity. It therefore desirable to determine a sequence that avoids these negative issues—e.g., a semi-perfect sequence of trivial dimensionality (such as 2s exponent or 3s exponent)—while also having sufficient length to encompass an indoor channel in a high rate (e.g, high resolution) sampling paradigm.

In some embodiments, this includes selecting an initial real sequence with perfect circular autocorrelation. For example, an initial m-sequence x[n] may be selected. The sequence x[n] may have a length $2^d-1$, where d may be a generating polynomial degree. A length of the initial real sequence may be modified. In some embodiments, an element 0 is added to location k=0 within the sequence x[n]. According to some embodiments, a Fourier transform of the matrix $\Theta$ is taken, such that $\Theta = \text{Diag}\{F(x[n])\}$. Then a phase response (e.g., a frequency response) of $\Theta$ with unity amplitude may be taken, and the resulting diagonal matrix may be defined as $\Theta_u^\circ$. Those skilled in the art will note that the phase-only spectrum translates to a perfect sequence; but the corresponding time-domain sequence may no longer be ternary. A frequency response of the initial real sequence may thus be converted to the time domain. For example, an inverse Fourier transform of $\Theta_u^o$, may be derived and defined as $x_u^o[n]$. It should be recognized that a phase spectrum of a semi-perfect sequence may be a conjugate symmetric vector and, thus, a corresponding time response may be a real vector.

A time domain of the initial real sequence may be quantitized to a predetermined number of levels within an optimal threshold. Thus, in some cases, quantization, e.g., a three level quantization, is applied to $x_u^o[n]$ to arrive at $x_Q^o[n]$, which may be a ternary sequence.

It may be desirable to employ ternary sequences because they may allow for, relatively, easy implementation using low-complexity impulse radio circuit design techniques. Ternary sequences may obviate a need for applying additional modulators to an impulse radio pulse generator. In a ternary sequence $\{0, 1, -1\}$, for example, the 0 may be silent, 1 may represent a positive polarity pulse, and −1 may represent a negative polarity pulse. Those skilled in the art will recognize that many low-power devices may suitably implement such a pulse train sequence with low complexity, in terms of chipset and/or operational power consumption.

By way of illustration, $$x_Q^o = \begin{cases} 0 & : \ |x_u^o[n]| < \eta \\ +1 & : \ x_u^o[n] > \eta \\ -1 & : \ x_u^o[n] < -\eta \end{cases} \quad (12)$$

In some embodiments, a symmetric quantization level is defined as $\eta=0.6$, which can be optimized by a 1-dimensional sweep to minimize the corresponding $MSE_L$. The sequence $x_Q^o[n]$ then may be converted to a frequency domain, $\Theta^o$, and the optimization metric, which may also be referred to as a performance metric, $MSE_L=10\times\log(Tr\{|\Theta|^{-2}\}Tr\{|\Theta|^2\})$ may be applied. In some cases, the performance metric is iteratively calculated based on the initial modified length and the quantized time domain of the sequence. For example, by sweeping across position index $k=1, \ldots, N$ until a minimum $MSE_L$ is reached. Thus determining semi-perfect sequences may include determining whether to perform additional modifications to the length of the initial real sequence, based on the iterative calculations. The frequency response, $\Theta^o$, associated with a minimum $MSE_L$ may represent a candidate sequence to employ in the location tracking system. Such candidate sequences may be referred to as semi-perfect sequences with 2s exponent dimensionality.

In some embodiments, a performance metric includes a maximum autocorrelation peak, A. A preamble sequences, e.g., a preamble base, may be selected based on a minimum $MSE_L$ and/or a maximum autocorrelation peak. Employing $MSE_L$ may result in increased sensitivity with lower-SNR observation. Utilizing a minimum MSE metric may allow a device to operate with lower SNR settings and/or with a longer range of reception. In other cases, utilizing maximum autocorrelation peak may result in decreased transmitter circuit complexity because peak to average power ratio may decrease with greater preamble lengths. For example, in situations in which implementation complexity is not a principal concern, a trivial solution sequence determination may exist, e.g., x[n]=1. Thus, x[n]=[+1, +1, +1, −1] is an example where N=4 and A=4. Such sequences may result in 2s exponent preamble bases, and both may result in $MSE_L=0$ dB.

Figure 2A:
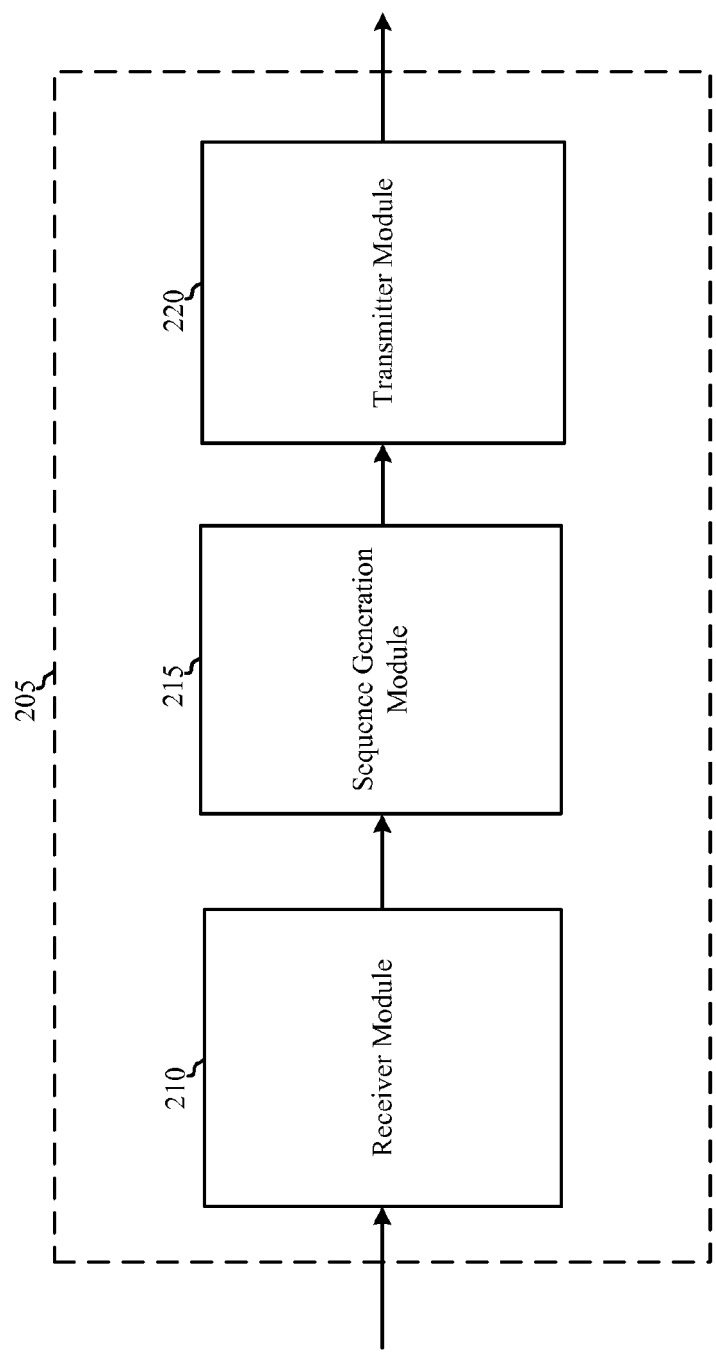
FIGS. 2A and 2B show block diagrams of example device(s) that may be employed in location tracking systems in accordance with various embodiments.

Next, turning to FIG. 2A, a block diagram illustrates a device 200 configured for communication with a location tracking system in accordance with various embodiments. The device 200 may be a channel estimation module 205, which may be an example or aspect of a tag 115, an AP 105, and/or a tracking management server 150 described with references to FIG. 1A and FIG. 1B. In some embodiments, the device 200 is a processor. The device 200 may include a receiver module 210, a sequence generation module 215, and/or a transmitter module 220. The receiver module 210 may receive signals transmitted from, e.g., tags 115 and/or APs 105. Additionally or alternatively, it may be configured with a receive filter optimized to receive perfect and/or semi-perfect sequence.

The sequence generation module 215 may process or control processing of signals received by the receiver module 210. The sequence generation module may also be a means for performing functions related to channel estimation, including determining semi-perfect sequences with 2's exponent dimensionality. In some embodiments, the sequence generation module determines and generates preferred preamble sequences for use the location tracking system 100. The sequence generation module may employ the above-discussed tools and techniques for determining a sequence. For example, various aspects of the sequence generation module may solve the above Optimization Problem 10 based on the discussion above. The transmitter module 220 may transmit sequences generated by the sequence generation module 215.

The receiver module 210, the sequence generation module 215, and/or the transmitter module 220 may be implemented in a single device. In some embodiments, the components of the device 200 are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

Figure 2B:
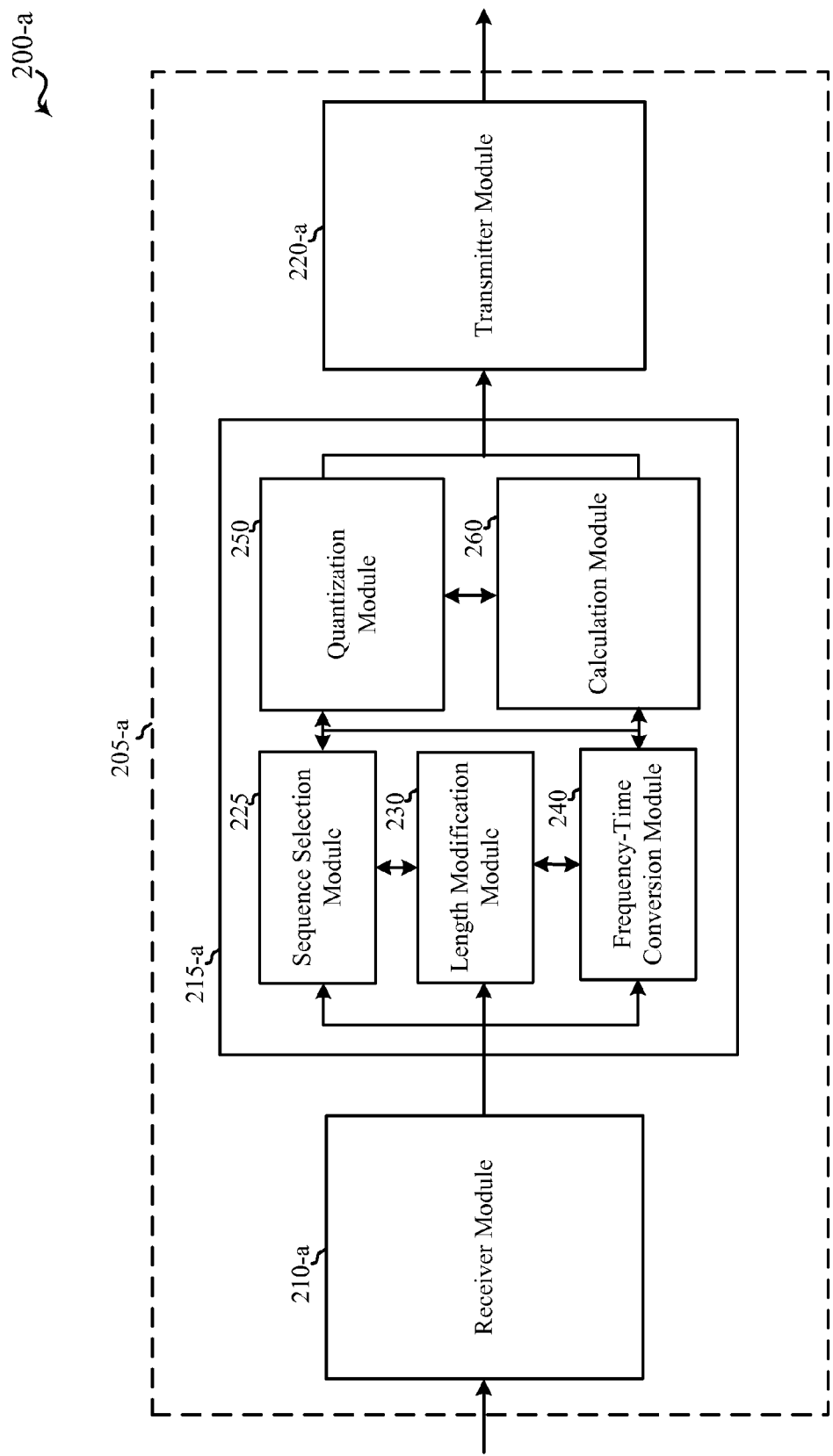

FIG. 2B shows a block diagram of a device 200-a configured for communication in a location tracking system in accordance with various embodiments. The device 200-a may be an example of the device 200 of FIG. 2A; it may also perform substantially the same functions as described with reference to FIG. 2A. The device 200-a may be a channel estimation module 205-a, and it may be an example of one or more aspects of an AP 105, a tag 115, and/or a tracking management server 150 described with reference to FIGS. 1A, 1B, and 2A. In some embodiments, the device 200-a is a processor. The device 200-a may include one or more of a receiver module 210-a, a sequence generation module 215-a, and a transmitter module 220-a. For example, these modules may be configured to perform substantially the same functions as the corresponding modules of device 200 of FIG. 2A.

The sequence generation module 215-a may be equipped with submodules configured to determine a preamble sequence. For example, the sequence generation module 215-a may determine a perfect or semi-perfect sequence for use in the location tracking system 100. It may select an initial real sequence at a sequence selection module 225. The initial real sequence may be a ternary or binary sequence. For example, an m-sequence, which is a binary sequence (e.g., a sequence {+1, −1}), may be used as an initial vector point in an N-dimensional search space of ternary sequences. In some cases, the initial real sequence has a length $2^d−1$. Additionally or alternatively, it may be selected from a set number of possible sequences having a large autocorrelation peak and/or small side lobes, or it may be generated randomly. In some instances, selecting a starting sequence with a desirable correlation pattern results in a better local optimal solution within the N-dimensional search space.

The sequence generation module 215-*a* may include a length modification module 230, which may perform an initial modification to a length of the real sequence selected by the sequence selection module 225. For instance, the length modification module 230 may add an element 0 to the real sequence selected by the sequence selection module 225. The sequence generation module 215-*a* may also include a frequency-time conversion module 240. In some embodiments, the frequency-time conversion module 240 employs an inverse Fourier transform to a frequency response of the initial real sequence.

The sequence generation module 250 may also include a quantitization module 250. The quantization module 250 may quantitize the time domain of the initial real sequence to a predetermined number of levels with an optimal threshold. For example, the quantitization module 250 may employ a three level quantization to a transformed sequence to determine a ternary sequence. Employing a higher level quantitization, e.g., more than three, may add degrees of freedom in the search space and may lead to better MSE performance. But, in some cases, this may increase implementation complexity and power consumption of the transmitter module.

Additionally or alternatively, the sequence generation module 215-*a* may include a calculate module, which may iteratively calculate (or solve) a performance metric to based on the initial modified length and the quantitized time domain of the sequence. In some cases, the calculation module 260 employs a MSE performance metric, such as the $MSE_L$ described above. In other embodiments, the calculation module 260 utilizes a maximum autocorrelation peak metric. In still other instances, the calculation module 260 calculates both MSE and a maximum autocorrelation peak. The calculation module 260 may also be configured to determine whether aspects of the sequence generation module 215-*a* should perform additional modification to the length of the initial real sequence.

The receiver module 210-*a*, the sequence generation module 215-*a*, and/or the transmitter module 220-*a* may be implemented in a single device, e.g., when the device is in charge of two-way communication. In some cases, the components of the device 200-*a* are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

Figure 3:
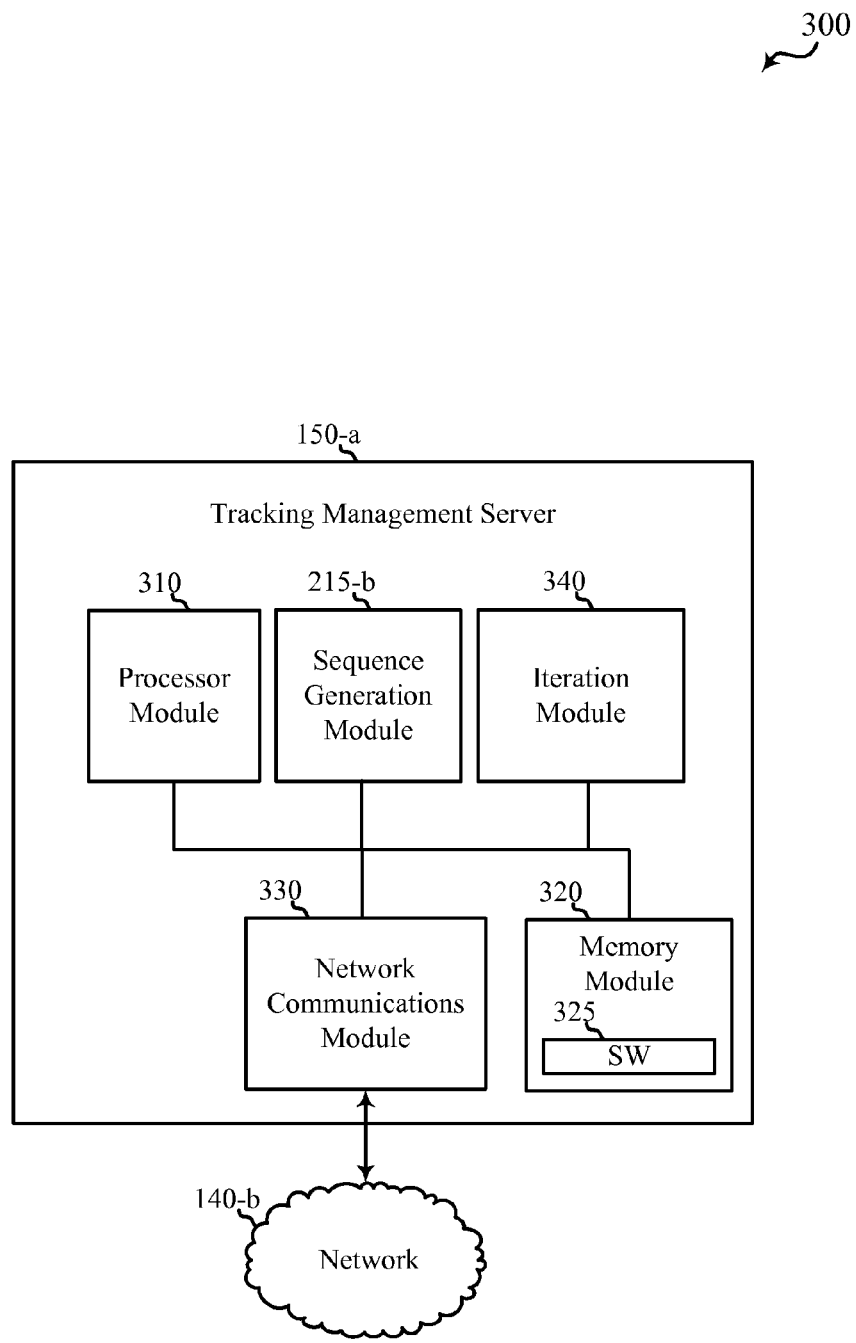
FIG. 3 shows a block diagram of an example of a location tracking system in accordance with various embodiments.

Now, turning to FIG. 3, which shows a block diagram of a system 300 configured for communication within a location tracking system according to various embodiments. In some embodiments, the system 300 includes a tracking management server 150-*a*, which may be the tracking management server 150 of FIGS. 1A and 1B. The tracking management server 150-*a* may include a sequence generation module 215-*b*, a processor module 310, a memory module 320 (and software 325), a network communications module 330, an iteration module 340. Each of the components of the tracking management server 150-*a* may be in communication with each other.

According to some embodiments, the tracking management server 150-*a* may perform some or all of the functions described with reference to the channel estimation module 210, described with reference to FIGS. 2A and 2B. For example, the tracking management server may be configured to determine semi-perfect sequences with 2s exponent dimensionality. The sequence generation module 215-*b* may perform substantially the same functions as the sequence generation module 215-*a* described with reference to FIG. 2B. In some embodiments, the iteration module 340 is configured to determine whether aspects of the sequence generation module 215-*b* should perform additional modification to the length of the initial real sequence.

The processor module 310 may also perform various operations related to channel estimation, including determining a preamble sequence; and, in some embodiments, it includes an intelligent hardware device (e.g., a CPU). The tracking management server 150-*a* may also communicate with a network 140-*b* through the network communications module 330 to send information to and/or receive information from APs 105 determining and/or utilizing certain sequences. Likewise, the tracking management server 150-*a* may send or receive information related to identified or identifying channel characteristics. The network 140-*b* may be an example of the networks 140 of FIGS. 1A and 1B.

The memory module 320 may include RAM or ROM, or both. In some embodiments, the memory module 320 stores computer-readable, computer-executable software code 325 containing instructions that are configured to, when executed, cause the processor module 310, the sequence generation module 215-*b*, and/or the iteration module 340 to perform various functions described herein. In other embodiments, the software code 325 may not be directly executable by the processor module 310; but the software code 325 may be configured to cause a computer, e.g., when compiled and executed, to perform the functions described herein.

The various modules of the tracking management server 150-*a* may be implemented in a single device. In some cases, the components of the tracking management server 150-*a* are, individually or collectively, implemented with one or more application-specific integrated circuits (ASICs) adapted to perform some or all of the applicable functions in hardware. Alternatively, the functions may be performed by one or more processing units (or cores), on one or more integrated circuits. In other embodiments, other types of integrated circuits are used (e.g., Structured/Platform ASICs, field-programmable gate arrays (FPGAs), and other Semi-Custom integrated circuits (ICs)), which may be programmed in any manner known in the art. The functions of each unit also may be wholly or partially implemented with instructions embodied in a memory, formatted to be executed by one or more general or application-specific processors.

Figure 4:
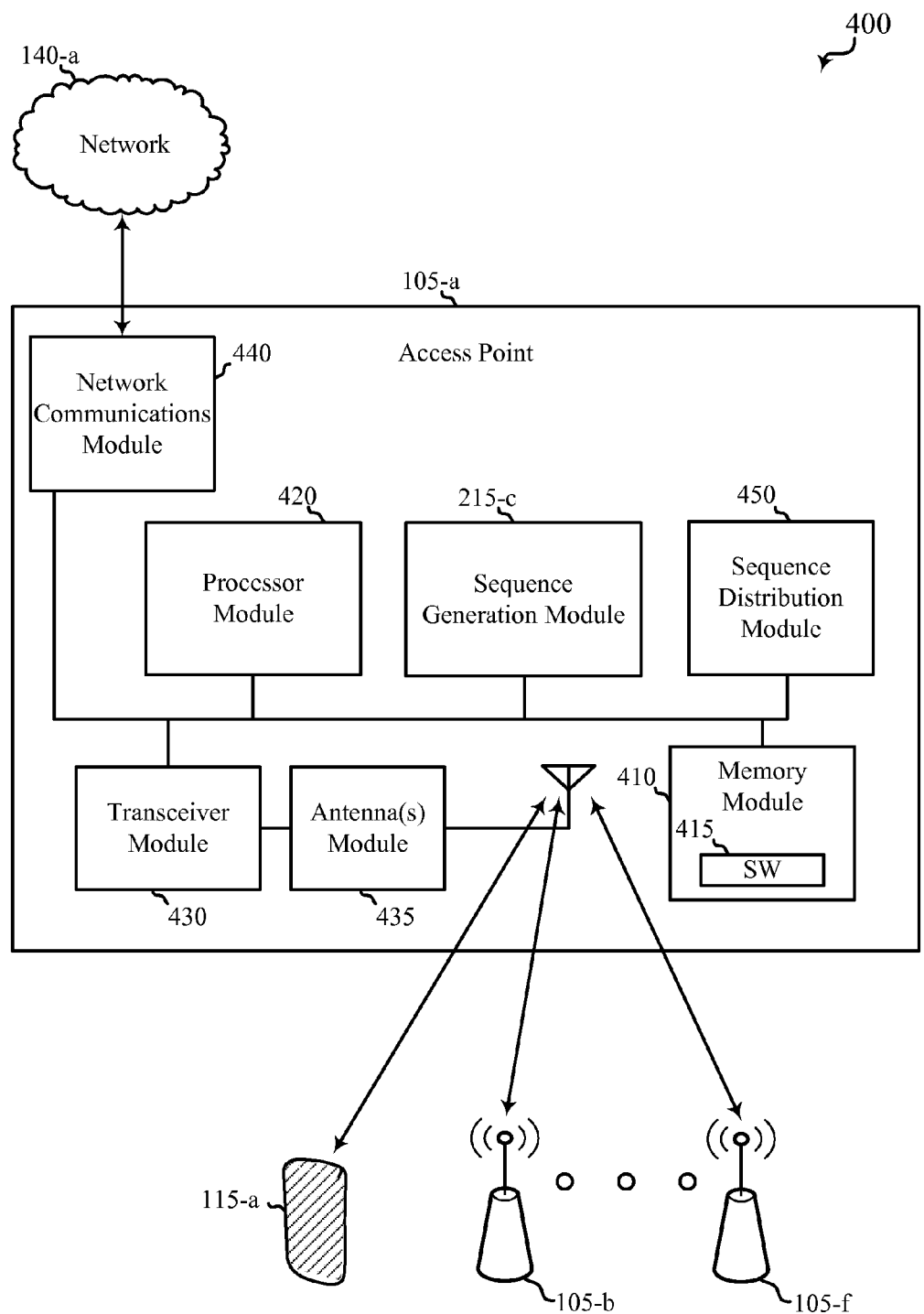
FIG. 4 shows a block diagram of an example of a location tracking system in accordance with various embodiments.

Next, FIG. 4 depicts a block diagram of a system 400 configured for communication within a location tracking system in accordance with various embodiments. The system 400 may include APs 105-*c*, and 105-*b* through 105-*f*, which may be examples of the APs 105 described with reference to one or more of FIGS. 1A, 1B, 2A, and 2B. The AP 105-*a* may include a memory module 410, which, in some embodiments, includes a software (SW) module 415. The AP 105-*a* may include a processor module 420, a transceiver module 430, antenna(s) module 435, a network communications module 440 and/or a sequence distribution module 450. Each of the components of the AP 105-*a* may be in communication with each other. The network communications module 440 may be in communication with the network 140-*a*, which may be an example of the network 140 of FIGS. 1A and 1B.

In some embodiments, the AP 105-*a* also includes a sequence generation module 215-*c*, which may perform substantially the same functions of the sequence generation modules 215 of FIGS. 2A and 2B. By way of example, the sequence generation module 215-*c* is configured to perform functions related to channel estimation, including determining a preamble sequence. Additionally or alternatively, the AP 105-*a* may include a sequence distribution module 450, which may transmit or otherwise convey a determined sequence to tags 115.

The memory module 410 may include random access memory (RAM) and/or read-only memory (ROM). In some embodiments, the memory module 410 also stores computer-readable, computer executable software (SW) code 415 containing instructions configured to, when executed, cause the processor module 420 and/or the sequence generation module 215-*c* to perform various functions related to determining and utilizing a sequence, as described herein. In other embodiments, the software (SW) code 415 may not be directly executable by the processor module 420; but it may be configured to cause a computer, for example, when compiled and executed, to perform the functions described herein.

The processor module 420 may include an intelligent hardware device, such as a central processing unit (CPU). The processor module 420 may perform various operations associated with determining a preamble sequence, as well as additional channel estimation functions. The processor module 420 may use information received from, for example, the tracking management server 150, by way of the network 140-*a*, to determine a sequence to employ. For example, the tracking management server 150 may determine a preamble sequence, which may be a ternary sequence, for use in the system 100. The tracking management server 150 may transmit information related to the sequence (or the sequence itself) to the AP 105-*a*. The AP 105-*a* may in turn utilize the sequence, or it may relay information about the sequence to the tag 115-*a*, and the tag 115-*a* may employ the sequence.

Some embodiments of the AP 105-*a* include a single antenna; other embodiments include multiple antennas. Signals transmitted from a tag 115-*a* may be received by the AP 105-*a* via the antenna(s) in the antenna(s) module 440. The AP 105-*c* may also wirelessly communicate with other APs, such as APs 105-*b* through 105-*f*.

Figure 5:
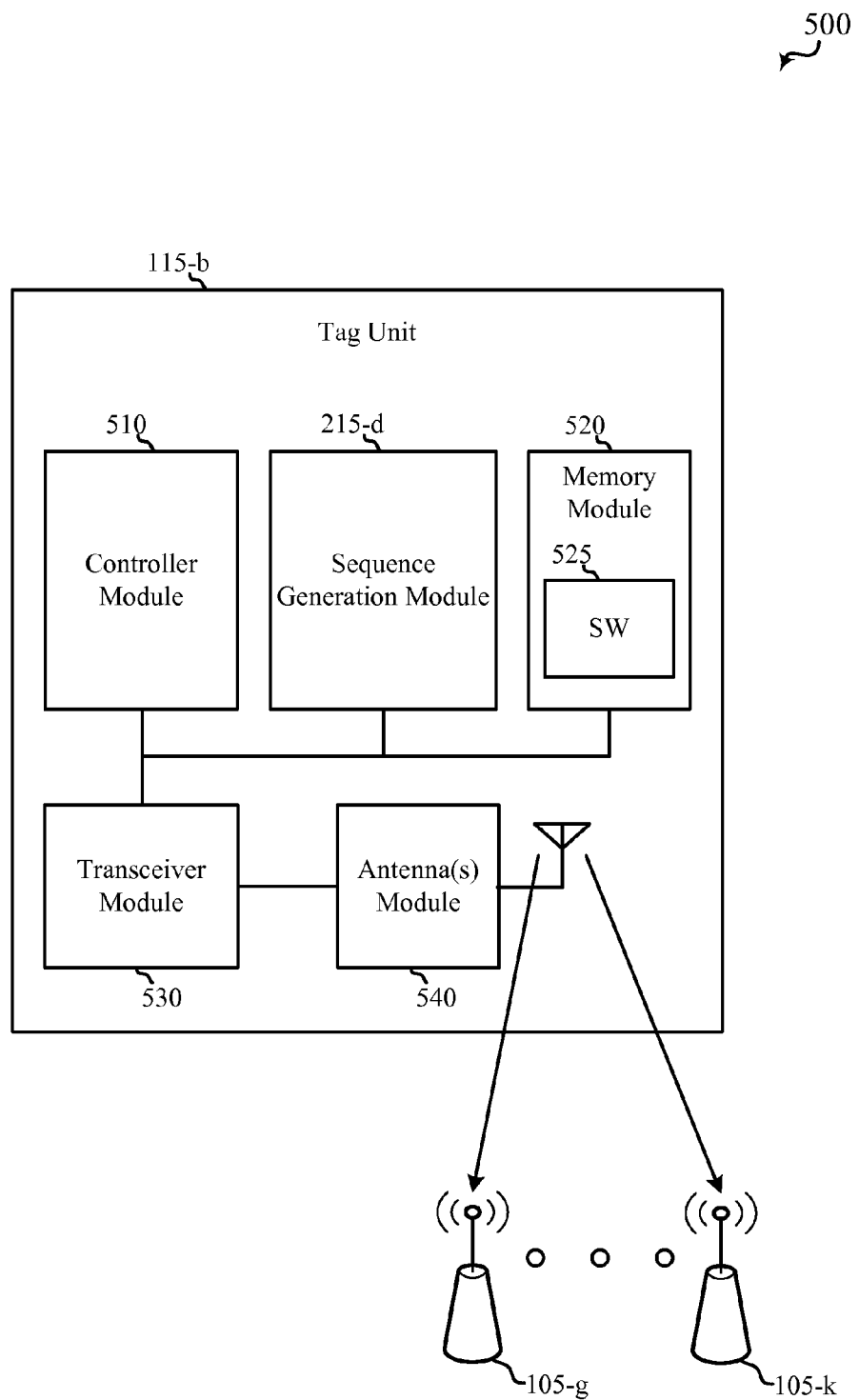
FIG. 5 shows a block diagram of an example of a location tracking system in accordance with various embodiments.

Next, FIG. 5 shows a block diagram illustrating a system 500 configured for communication within a location tracking system according to various embodiments. The system 500 may include a tag unit 115-*b*. In some embodiments, the tag unit 115-*b* includes one or more aspects of the tag units 115 of one or both of FIGS. 1A and 1B. The tag unit 115-*b* may include a controller module 510, a memory module 520, which may include a software (SW) module 525, a transceiver module 530, and/or an antenna(s) module 540. Each of the components of the tag unit 115-*b* may be in communication with each other.

In some cases, the tag unit 115-*b* includes a sequence generation module 215-*d*, which may perform substantially the same functions as the sequence generation modules 215 of FIGS. 2A and 2B. By way of example, the sequence generation module 215-*d* is configured to perform functions related to channel estimation, including determining a preamble sequence.

In some embodiments, the controller module 510 includes logic or code, or both, that enables it to control the operations of the tag unit 115-*b*. For instance, the controller module 510 may include a microcontroller or a state machine to control the transceiver module 530 to broadcast a preamble sequence determined by the sequence generation module 215-*d*. In some cases, the transceiver module 530, via the antenna(s) module 540, receives information from one or more APs 105 regarding the sequence the tag unit 115-*b* should use for signal broadcasts.

The memory module 520 may include random access memory (RAM) or read-only memory (ROM), or both. In some embodiments, the memory module 520 stores computer-readable, computer-executable software (SW) code 525 containing instructions that are configurable to, when executed, cause the controller module 510 to perform various functions described herein for determining a sequence and/or for controlling the tag unit 115-*b* according to a determined sequence. In other embodiments, the software code 525 is not directly executable by the controller module 510, but it may be configured to cause a computer, for example, when compiled and executed, to perform functions described herein.

FIG. 5 shows broadcast and reception of signals between the tag unit 115-*b* and several APs 105. In the system 500, several APs 105-*g* through 105-*k* are shown communicating with the tag unit 115-*b*; but the tag unit 115-*b* may communicate with more or fewer APs 105. By way of illustration, the tag unit 115-*b*, utilizing the transceiver module 530, may transmit a signal based on a semi-perfect sequence with 2s exponent dimensionality to several APs 105. The tracking management server 150 may perform channel estimation based on, in part, the respective round-trip delay associated with the APs 105-*g* through 105-*k* receiving the signal.

Figure 6:
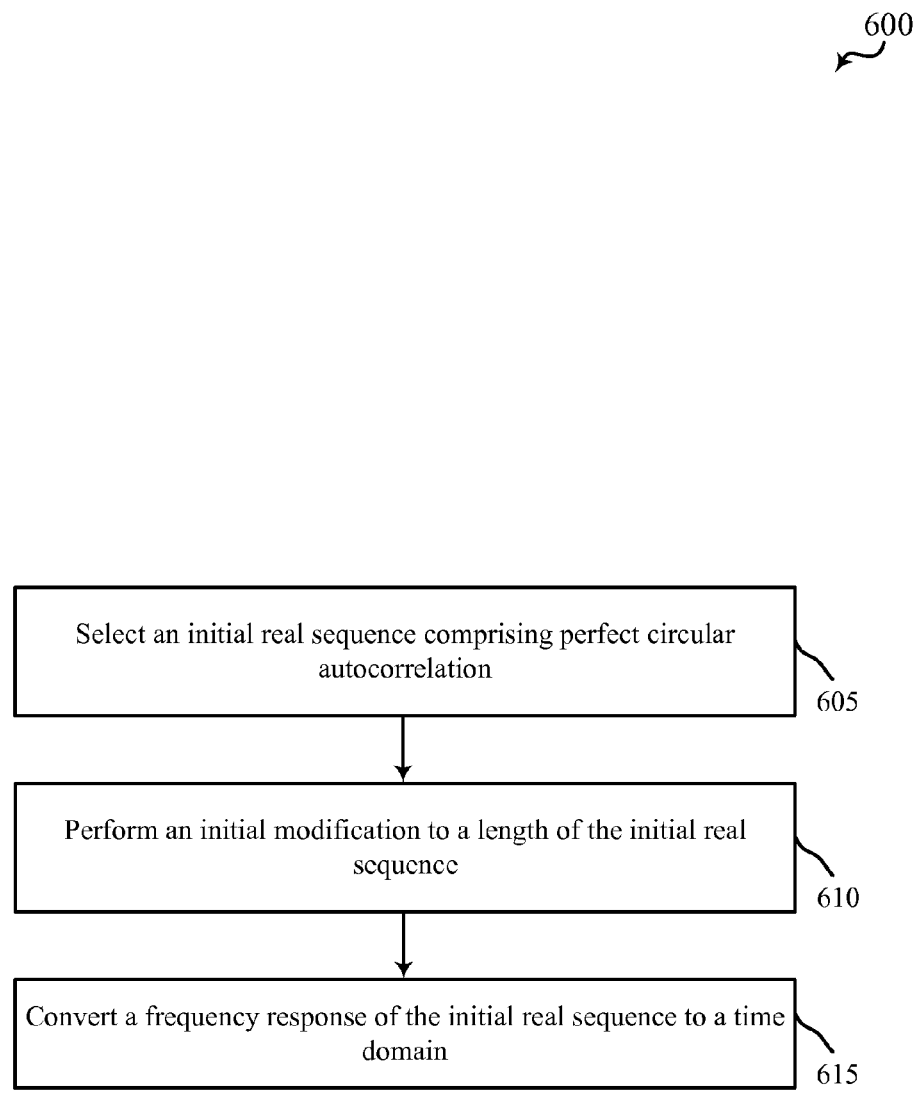
FIG. 6 is a flow diagram of a method of communication within a location tracking system in accordance with various embodiments.

Referring now to FIG. 6, which shows a flow diagram that illustrates a method 600 of communication within a location tracking system, according to various embodiments. By way of example, the method 600 is implemented using one or more of the devices and systems 100, 200, 200-*a*, 300, 400, and 500 of FIGS. 1A, 1B, 2A, 2B, 3, 4, and 5.

At block 605, the method may include selecting an initial real sequence, which may have perfect circular autocorrelation. The operations at block 605, in some cases, may be preformed by: the APs 105, the tag units 115, and/or the tracking management server 150 of FIGS. 1A and 1B; the sequence generation module 215 of FIG. 2A; the sequence generation module 215-*a* and/or the sequence selection module 225 of FIG. 2B; the sequence generation module 215-*b* of FIG. 3; the sequence generation module 215-*c* of FIG. 4; and/or the sequence generation module 215-*d* of FIG. 5.

At block 610, the method may involve performing an initial modification to a length of the initial real sequence. The operations at block 610, in some instances, may be performed by: the APs 105, the tag units 115, and/or the tracking management server 150 of FIGS. 1A and 1B; the sequence generation module 215 of FIG. 2A; the sequence generation module 215-*a* and/or the length modification module 230 of FIG. 2B; the sequence generation module 215-*b* of FIG. 3; the sequence generation module 215-*c* of FIG. 4; and/or the sequence generation module 215-*d* of FIG. 5.

Then, at block 615, the method may include converting a frequency response of the initial real sequence to a time domain. The operations at block 615 may be performed, for example, by: the APs 105, the tag units 115, and/or the tracking management server 150 of FIGS. 1A and 1B; the sequence generation module 215 of FIG. 2A; the sequence generation module 215-a and/or the frequency-time conversion module 240 of FIG. 2B; the sequence generation module 215-b of FIG. 3; the sequence generation module 215-c of FIG. 4; and/or the sequence generation module 215-d of FIG. 5.

Figure 7:
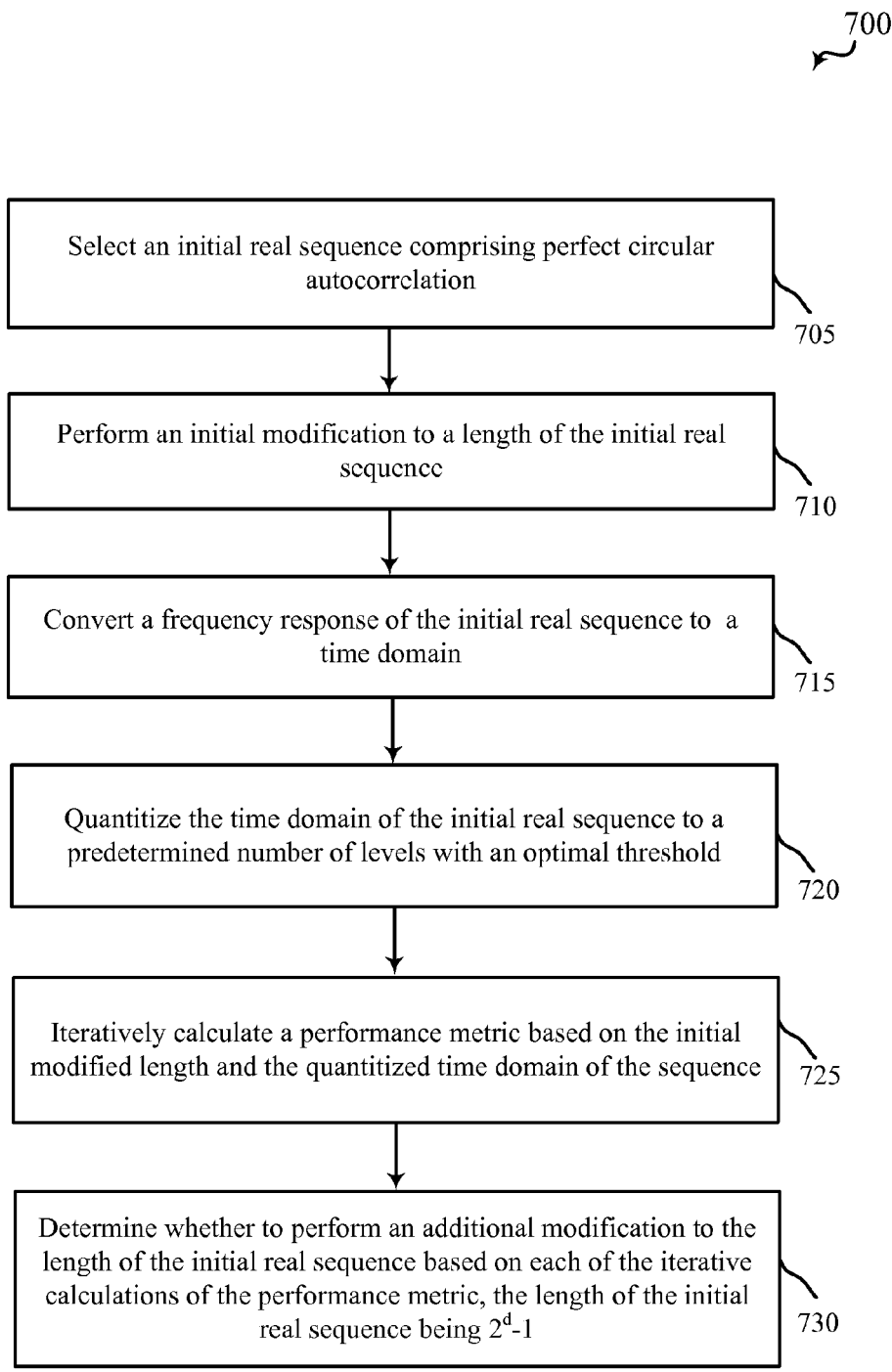
FIG. 7 is a flow diagram of a method of communication within a location tracking system in accordance with various embodiments.

Next, FIG. 7 shows a flow diagram that illustrates a method 700 of communication within a location tracking system, according to various embodiments. The method 700 may be implemented using one or more of the devices and systems 100, 200, 200-a, 300, 400, and 500 of FIGS. 1A, 1B, 2A, 2B, 3, 4, and 5.

At block 705, the method may include selecting an initial real sequence, which may have perfect circular autocorrelation. The operations at block 705, in some cases, may be preformed by: the APs 105, the tag units 115, and/or the tracking management server 150 of FIGS. 1A and 1B; the sequence generation module 215 of FIG. 2A; the sequence generation module 215-a and/or the sequence selection module 225 of FIG. 2B; the sequence generation module 215-b of FIG. 3; the sequence generation module 215-c of FIG. 4; and/or the sequence generation module 215-d of FIG. 5.

At block 710, the method may involve performing an initial modification to a length of the initial real sequence. The operations at block 710, in some instances, may be performed by: the APs 105, the tag units 115, and/or the tracking management server 150 of FIGS. 1A and 1B; the sequence generation module 215 of FIG. 2A; the sequence generation module 215-a and/or the length modification module 230 of FIG. 2B; the sequence generation module 215-b of FIG. 3; the sequence generation module 215-c of FIG. 4; and/or the sequence generation module 215-d of FIG. 5.

Then, at block 715, the method may include converting a frequency response of the initial real sequence to a time domain. The operations at block 715 may be performed, for example, by: the APs 105, the tag units 115, and/or the tracking management server 150 of FIGS. 1A and 1B; the sequence generation module 215 of FIG. 2A; the sequence generation module 215-a and/or the frequency-time conversion module 240 of FIG. 2B; the sequence generation module 215-b of FIG. 3; the sequence generation module 215-c of FIG. 4; and/or the sequence generation module 215-d of FIG. 5.

At block 720, the method may further include quantitizing the time domain of the initial real sequence to a predetermined number of levels with an optimal threshold. The operations at block 720 may be performed, for example, by: the APs 105, the tag units 115, and/or the tracking management server 150 of FIGS. 1A and 1B; the sequence generation module 215 of FIG. 2A; the sequence generation module 215-a and/or the quantitization module 250 of FIG. 2B; the sequence generation module 215-b of FIG. 3; the sequence generation module 215-c of FIG. 4; and/or the sequence generation module 215-d of FIG. 5.

Next, at block 725, the method may involve iteratively calculating a performance metric based on the initial modified length and the quantized time domain of the sequence. The operations of block 725 may be performed, for example, by the APs 105, the tag units 115, and/or the tracking management server 150 of FIGS. 1A and 1B; the sequence generation module 215 of FIG. 2A; the sequence generation module 215-a and/or the calculation module 260 of FIG. 2B; the sequence generation module 215-b and/or the iteration module 340 of FIG. 3; the sequence generation module 215-c of FIG. 4; and/or the sequence generation module 215-d of FIG. 5.

At block 730, the method may further include determining whether to perform an additional modification to the length of the initial real sequence based on each of the iterative calculations of the performance metric. In some cases, the length of the initial real sequence may be $2^d-1$. The operations of block 730 are, in some cases, implemented by: the APs 105, the tag units 115, and/or the tracking management server 150 of FIGS. 1A and 1B; the sequence generation module 215 of FIG. 2A; the sequence generation module 215-a and/or the calculation module 260 of FIG. 2B; the sequence generation module 215-b and/or iteration module 340 of FIG. 3; the sequence generation module 215-c of FIG. 4; and/or the sequence generation module 215-d of FIG. 5.

Figure 8:
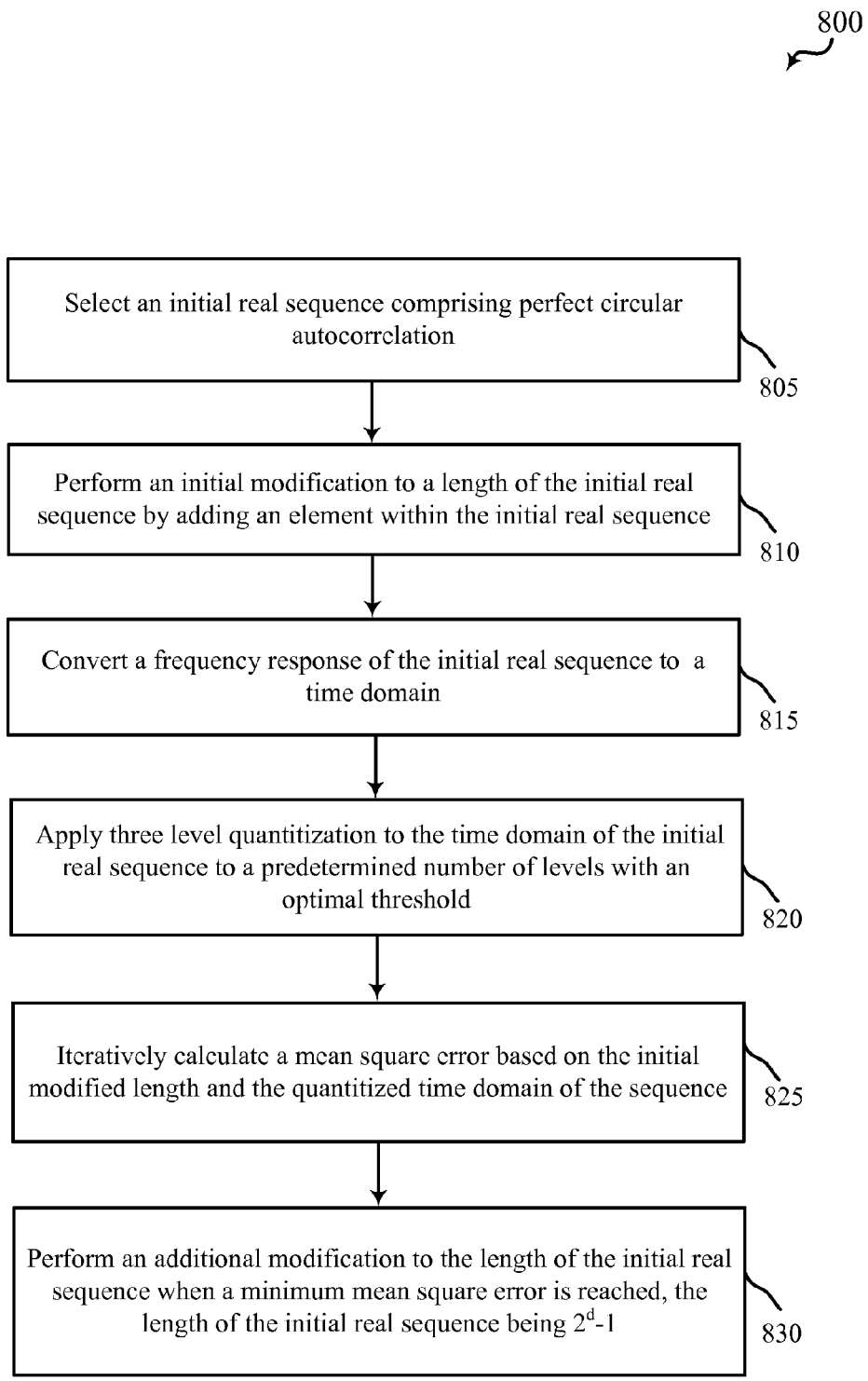
FIG. 8 is a flow diagram of a method of communication within a location tracking system in accordance with various embodiments.

FIG. 8 shows a flow diagram that illustrates a method 800 of communication within a location tracking system, according to various embodiments. The method 800 may be implemented using one or more of the devices and systems 100, 200, 200-a, 300, 400, and 500 of FIGS. 1A, 1B, 2A, 2B, 3, 4, and 5.

At block 805, the method may include selecting an initial real sequence, which may have perfect circular autocorrelation. The operations at block 805, in some cases, may be preformed by: the APs 105, the tag units 115, and/or the tracking management server 150 of FIGS. 1A and 1B; the sequence generation module 215 of FIG. 2A; the sequence generation module 215-a and/or the sequence selection module 225 of FIG. 2B; the sequence generation module 215-b of FIG. 3; the sequence generation module 215-c of FIG. 4; and/or the sequence generation module 215-d of FIG. 5.

At block 810, the method may involve performing an initial modification to a length of the initial real sequence, which may include adding an element with in the initial real sequence. The operations at block 810, in some instances, may be performed by: the APs 105, the tag units 115, and/or the tracking management server 150 of FIGS. 1A and 1B; the sequence generation module 215 of FIG. 2A; the sequence generation module 215-a and/or the length modification module 230 of FIG. 2B; the sequence generation module 215-b of FIG. 3; the sequence generation module 215-c of FIG. 4; and/or the sequence generation module 215-d of FIG. 5.

Then, at block 815, the method may include converting a frequency response of the initial real sequence to a time domain. The operations at block 815 may be performed, for example, by: the APs 105, the tag units 115, and/or the tracking management server 150 of FIGS. 1A and 1B; the sequence generation module 215 of FIG. 2A; the sequence generation module 215-a and/or the frequency-time conversion module 240 of FIG. 2B; the sequence generation module 215-b of FIG. 3; the sequence generation module 215-c of FIG. 4; and/or the sequence generation module 215-d of FIG. 5.

At block 820, the method may further include applying a three level quantization to the time domain of the initial real sequence to a predetermined number of levels with an optimal threshold. The operations at block 820 may be performed, for example, by: the APs 105, the tag units 115, and/or the tracking management server 150 of FIGS. 1A and 1B; the sequence generation module 215 of FIG. 2A; the sequence generation module 215-a and/or the quantitization module 250 of FIG. 2B; the sequence generation module 215-b of FIG. 3; the sequence generation module 215-c of FIG. 4; and/or the sequence generation module 215-d of FIG. 5.

Next, at block 825, the method may involve iteratively calculating a mean square error based on the initial modified length and the quantized time domain of the sequence. The operations of block 825 may be performed, for example, by the APs 105, the tag units 115, and/or the tracking management server 150 of FIGS. 1A and 1B; the sequence generation module 215 of FIG. 2A; the sequence generation module 215-a and/or the calculation module 260 of FIG. 2B; the sequence generation module 215-b and/or the iteration module 340 of FIG. 3; the sequence generation module 215-c of FIG. 4; and/or the sequence generation module 215-d of FIG. 5.

At block 830, the method may further include determining whether to perform an additional modification to the length of the initial real sequence when a minimum mean square error is reached. In some cases, the length of the initial real sequence may be $2^d-1$. The operations of block 830 are, in some cases, implemented by: the APs 105, the tag units 115, and/or the tracking management server 150 of FIGS. 1A and 1B; the sequence generation module 215 of FIG. 2A; the sequence generation module 215-a and/or the calculation module 260 of FIG. 2B; the sequence generation module 215-b and/or iteration module 340 of FIG. 3; the sequence generation module 215-c of FIG. 4; and/or the sequence generation module 215-d of FIG. 5.

Figure 9:
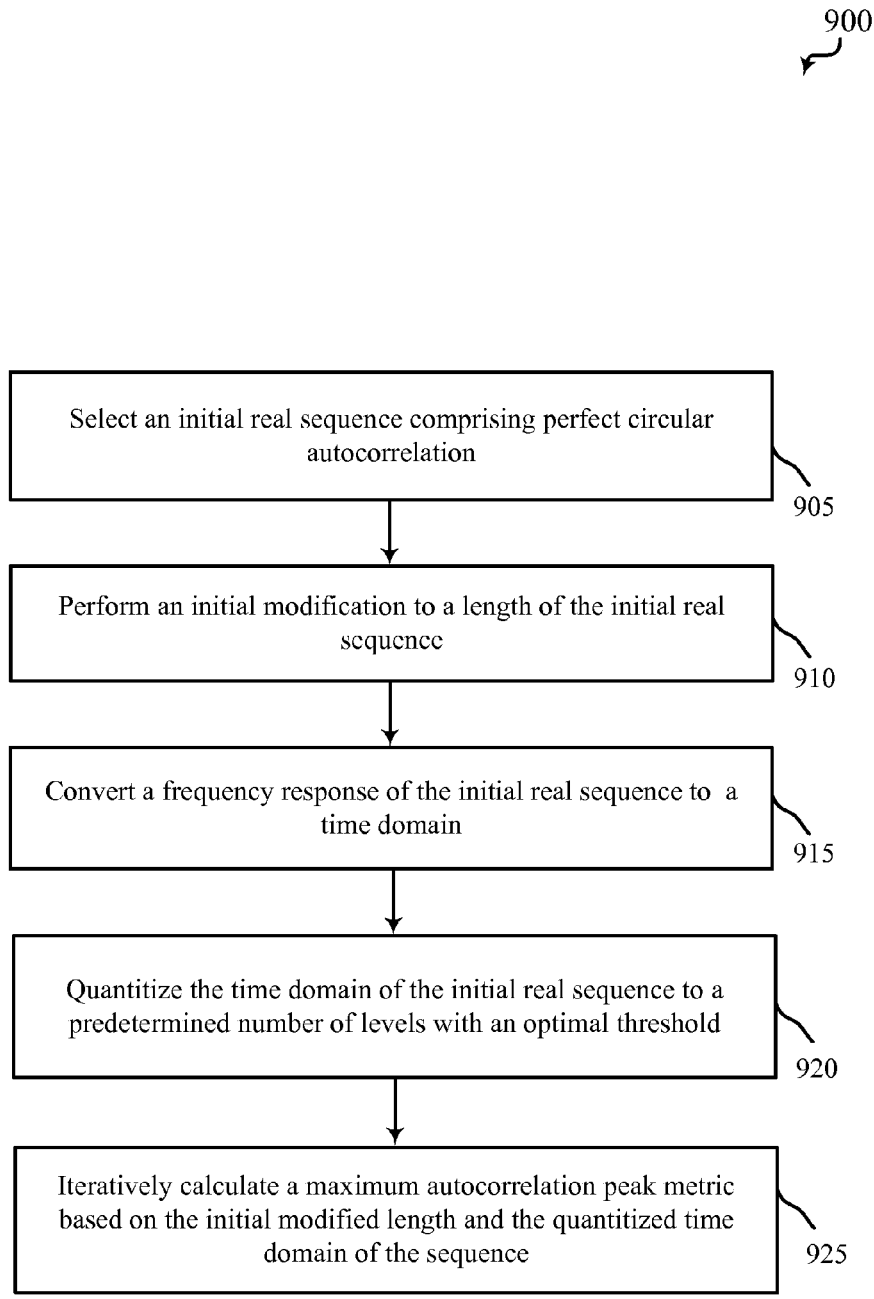
FIG. 9 is a flow diagram of a method of communication within a location tracking system in accordance with various embodiments.

Then, FIG. 9 shows a flow diagram that illustrates a method 900 of communication within a location tracking system, according to various embodiments. The method 900 may be implemented using one or more of the devices and systems 100, 200, 200-a, 300, 400, and 500 of FIGS. 1A, 1B, 2A, 2B, 3, 4, and 5.

At block 905, the method may include selecting an initial real sequence, which may have perfect circular autocorrelation. The operations at block 905, in some cases, may be preformed by: the APs 105, the tag units 115, and/or the tracking management server 150 of FIGS. 1A and 1B; the sequence generation module 215 of FIG. 2A; the sequence generation module 215-a and/or the sequence selection module 225 of FIG. 2B; the sequence generation module 215-b of FIG. 3; the sequence generation module 215-c of FIG. 4; and/or the sequence generation module 215-d of FIG. 5.

At block 910, the method may involve performing an initial modification to a length of the initial real sequence. The operations at block 910, in some instances, may be performed by: the APs 105, the tag units 115, and/or the tracking management server 150 of FIGS. 1A and 1B; the sequence generation module 215 of FIG. 2A; the sequence generation module 215-a and/or the length modification module 230 of FIG. 2B; the sequence generation module 215-b of FIG. 3; the sequence generation module 215-c of FIG. 4; and/or the sequence generation module 215-d of FIG. 5.

Then, at block 915, the method may include converting a frequency response of the initial real sequence to a time domain. The operations at block 915 may be performed, for example, by: the APs 105, the tag units 115, and/or the tracking management server 150 of FIGS. 1A and 1B; the sequence generation module 215 of FIG. 2A; the sequence generation module 215-a and/or the frequency-time conversion module 240 of FIG. 2B; the sequence generation module 215-b of FIG. 3; the sequence generation module 215-c of FIG. 4; and/or the sequence generation module 215-d of FIG. 5.

At block 920, the method may further include quantitizing the time domain of the initial real sequence to a predetermined number of levels with an optimal threshold. The operations at block 920 may be performed, for example, by: the APs 105, the tag units 115, and/or the tracking management server 150 of FIGS. 1A and 1B; the sequence generation module 215 of FIG. 2A; the sequence generation module 215-a and/or the quantization module 250 of FIG. 2B; the sequence generation module 215-b of FIG. 3; the sequence generation module 215-c of FIG. 4; and/or the sequence generation module 215-d of FIG. 5.

Next, at block 925, the method may involve iteratively calculating a maximum autocorrelation peak metric based on the initial modified length and the quantized time domain of the sequence. The operations of block 925 may be performed, for example, by the APs 105, the tag units 115, and/or the tracking management server 150 of FIGS. 1A and 1B; the sequence generation module 215 of FIG. 2A; the sequence generation module 215-a and/or the calculation module 260 of FIG. 2B; the sequence generation module 215-b and/or the iteration module 340 of FIG. 3; the sequence generation module 215-c of FIG. 4; and/or the sequence generation module 215-d of FIG. 5.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method to perform channel estimation, comprising:
    selecting, in a time domain, an initial real sequence comprising perfect circular autocorrelation;
    performing, in the time domain, an initial modification to a length of the initial real sequence;
    determining a phase response of a frequency domain version of the modified initial real sequence;
    converting the phase response to a time domain response; and
    transmitting, at a transmitter, a preamble generated based at least in part on the time domain response.

2. The method of claim 1, further comprising:
    quantizing the time domain response to a predetermined number of levels with an optimal threshold; and
    iteratively calculating a performance metric based at least in part on the initial modified length and the quantitized time domain response.

3. The method of claim 2, wherein the quantizing comprises applying a three level quantization.

4. The method of claim 2, further comprising:
    determining whether to perform an additional modification to the length of the initial real sequence based at least in part on each of the iterative calculations of the performance metric, the length of the initial real sequence being $2^d-1$, where d is a dimensionality of the preamble.

5. The method of claim 4, wherein the performance metric comprises a mean square error function.

6. The method of claim 4, wherein the performance metric comprises a maximum autocorrelation peak metric.

7. The method of claim 4, further comprising:
    determining to perform the additional modification when a minimum mean square error is reached.

8. The method of claim 1, wherein performing the initial modification comprises adding an element within the initial real sequence.

9. A system for performing channel estimation, comprising:
    means for selecting, in a time domain, an initial real sequence comprising perfect circular autocorrelation;
    means for performing, in the time domain, an initial modification to a length of the initial real sequence;
    means for determining a phase response of a frequency domain version of the modified initial real sequence;
    means for converting the phase response to a time domain response; and
    means for transmitting a preamble generated based at least in part on the time domain response.

10. The system of claim 9, further comprising:
    means for quantitizing the time domain response to a predetermined number of levels with an optimal threshold; and
    means for iteratively calculating a performance metric based at least in part on the initial modified length and the quantitized time domain response.

11. The system of claim 10, wherein the quantitizing comprises applying a three level quantization.

12. The system of claim 10, further comprising:
    means for determining whether to perform an additional modification to the length of the initial real sequence based at least in part on each of the iterative calculations of the performance metric, the length of the initial real sequence being $2^d-1$, where d is a dimensionality of the preamble.

13. The system of claim 12, wherein the performance metric comprises a mean square error function.

14. The system of claim 12, wherein the performance metric comprises a maximum autocorrelation peak metric.

15. The system of claim 12, further comprising:
    means for determining to perform the additional modification when a minimum means square error is reached.

16. The system of claim 9, wherein performing the initial modification comprises adding an element within the initial real sequence.

17. An apparatus for performing channel estimation, comprising:
    a transmitter;
    a processor;
    memory in electronic communication with the processor; and
    instructions stored in the memory, the instructions being executable by the processor to:
        select, in a time domain, an initial real sequence comprising perfect circular autocorrelation;
        perform, in the time domain, an initial modification to a length of the initial real sequence;
        determine a phase response of a frequency domain version of the modified initial real sequence;
        convert the phase response to a time domain response; and
        transmit, using the transmitter, a preamble generated based at least in part on the time domain response.

18. The apparatus of claim 17, wherein the instruction are further executable by the processor to:
    quantitize the time domain response to a predetermined number of levels with an optimal threshold; and iteratively calculate a performance metric based at least in part on the initial modified length and the quantitized time domain response.

19. The apparatus of claim 18, wherein the instructions executable by the processor to quantitize comprise instructions executable by the processor to apply a three level quantitization.

20. The apparatus of claim 18, wherein the instructions are further executable by the processor to:
determine whether to perform an additional modification to the length of the initial real sequence based at least in part on each of the iterative calculations of the performance metric, the length of the initial real sequence being $2^d-1$, where d is a dimensionality of the preamble.

21. The apparatus of claim 20, wherein the performance metric comprises a mean square error function.

22. The apparatus of claim 20, wherein the performance metric comprises a maximum autocorrelation peak metric.

23. The apparatus of claim 20, wherein the instructions are further executable by the processor to determine to perform the additional modification when a minimum mean square error is reached.

24. The apparatus of claim 17, wherein the instructions executable by the processor to perform the initial modification comprise instructions executable by the processor to add an element within the initial real sequence.

25. A computer-program product for channel estimation, the computer-program product comprising a non-transitory computer-readable medium storing instructions executable by a processor to:
select, in a time domain, an initial real sequence comprising perfect circular auto correlation;
perform, in the time domain, an initial modification to a length of the initial real sequence;
determine a phase response of a frequency domain version of the modified initial real sequence;
convert the phase response to a time domain response; and
transmit, at a transmitter, a preamble generated based at least in part on the time domain response.

26. The computer-program product of claim 25, wherein the instructions are further executable by the processor to:
quantitize the time domain response to a predetermined number of levels with an optimal threshold; and
iteratively calculate a performance metric based at least in part on the initial modified length and the quantitized time domain response.

27. The computer-program product of claim 26, wherein the instructions executable by the processor to quantitize comprise instructions executable by the processor to apply a three level quantitization.

28. The computer-program product of claim 26, wherein the instructions are further executable by the processor to:
determine whether to perform an additional modification to the length of the initial real sequence based at least in part on each of the iterative calculations of the performance metric, the length of the initial real sequence being $2^d-1$, where d is a dimensionality of the preamble.

29. The computer-program product of claim 28, wherein the performance metric comprises a mean square error function.

30. The computer-program product of claim 28, wherein the performance metric comprises a maximum autocorrelation peak metric.

* * * * *